United States Patent
Sinning et al.

(10) Patent No.: US 10,154,404 B2
(45) Date of Patent: Dec. 11, 2018

(54) PROVISIONING AN EMBEDDED UNIVERSAL INTEGRATED CIRCUIT ENTITY WITHIN AN ELECTRONIC DEVICE

(71) Applicant: Deutsche Telekom AG, Bonn (DE)

(72) Inventors: Thorsten Sinning, Aachen (DE); Sven Krey, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/517,525

(22) PCT Filed: Oct. 5, 2015

(86) PCT No.: PCT/EP2015/072953
§ 371 (c)(1),
(2) Date: Apr. 7, 2017

(87) PCT Pub. No.: WO2016/055417
PCT Pub. Date: Apr. 14, 2016

(65) Prior Publication Data
US 2017/0311152 A1    Oct. 26, 2017

(30) Foreign Application Priority Data

Oct. 10, 2014 (EP) .................................. 14188550

(51) Int. Cl.
*H04B 1/3816* (2015.01)
*H04W 8/18* (2009.01)
(Continued)

(52) U.S. Cl.
CPC .......... *H04W 8/183* (2013.01); *H04B 1/3816* (2013.01); *H04L 63/062* (2013.01);
(Continued)

(58) Field of Classification Search
None
See application file for complete search history.

(56) References Cited

U.S. PATENT DOCUMENTS 9,572,016 B2 * 2/2017 Cormier ................. H04W 8/183
9,980,129 B2 * 5/2018 Krey ....................... H04W 12/04
(Continued)

FOREIGN PATENT DOCUMENTS

WO    WO 2012028179 A1    3/2012

OTHER PUBLICATIONS

"3rd Generation Partnership Project; Technical Specification Group Services and System Aspects; Feasibility study on the security aspects of remote provisioning and change of subscription for Machine to Machine (M2M) equipment (Release 9)", 3GPP Standard; 3GPP TR 33.812, 3rd Generation Partnership Project (3GPP), Mobile Competence Centre; 650, Route Des Lucioles; F-06921 Sophia-Antipolis Cedex; France, No. V9.2.0, Jun. 22, 2010 (Jun. 22, 2010), pp. 1-87, XP050441986, p. 8.

*Primary Examiner* — David Bilodeau
(74) *Attorney, Agent, or Firm* — Leydig, Voit & Mayer, Ltd.

(57) ABSTRACT

A method for provisioning an embedded universal integrated circuit entity within an electronic device includes: in a first step, the embedded universal integrated circuit entity is initialized after being activated by a microprocessor; in a second step, the embedded universal integrated circuit entity transmits a secret information to the microprocessor; in a third step, the secret information is stored in a memory area; and in a fourth step, an initial communication contact, using radio link capabilities provided by a radio module, is established between, on the one hand, the electronic device and
(Continued)

the embedded universal integrated circuit entity, and, on the other hand, the mobile communication network or a server device.

15 Claims, 2 Drawing Sheets

(51) Int. Cl.
*H04L 29/06* (2006.01)
*H04W 12/04* (2009.01)
*H04W 12/06* (2009.01)

(52) U.S. Cl.
CPC ......... *H04L 63/0876* (2013.01); *H04W 12/04* (2013.01); *H04W 12/06* (2013.01)

(56) References Cited

U.S. PATENT DOCUMENTS

| | | | |
|---|---|---|---|
| 2008/0141313 A1* | 6/2008 | Kato | H04N 7/1675 725/62 |
| 2010/0106967 A1* | 4/2010 | Johansson | H04L 9/12 713/158 |
| 2011/0035584 A1* | 2/2011 | Meyerstein | H04W 8/265 713/155 |
| 2013/0288750 A1* | 10/2013 | Itoh | H04L 12/2856 455/558 |
| 2014/0337940 A1* | 11/2014 | Slavov | H04W 8/26 726/5 |
| 2016/0105784 A1* | 4/2016 | Gellens | H04M 3/5116 455/404.1 |

* cited by examiner

PROVISIONING AN EMBEDDED UNIVERSAL INTEGRATED CIRCUIT ENTITY WITHIN AN ELECTRONIC DEVICE

CROSS-REFERENCE TO RELATED APPLICATIONS

This application is a U.S. National Phase application under 35 U.S.C. § 371 of International Application No. PCT/EP2015/072953, filed on Oct. 5, 2015, and claims benefit to European Patent Application No. EP 14188550.9, filed on Oct. 10, 2014. The International Application was published in English on Apr. 14, 2016 as WO 2016/055417 A1 under PCT Article 21 (2).

FIELD

The present invention relates to a method for provisioning an embedded universal integrated circuit entity within an electronic device.

Furthermore, the present invention relates to a system for provisioning an embedded universal integrated circuit entity within an electronic device, the system comprising a mobile communication network and the electronic device with the embedded universal integrated circuit entity.

Additionally, the present invention relates to an electronic device for provisioning an embedded universal integrated circuit entity within the electronic device.

Furthermore, the present invention relates to a mobile communication network adapted for provisioning an embedded universal integrated circuit entity within an electronic device.

Additionally, the present invention relates to a program and to a computer program product for provisioning an embedded universal integrated circuit entity within an electronic device.

BACKGROUND

Nowadays, most mobile devices, also called user equipments, mobile terminals, or the like, to be used in connection with mobile communication networks—typically cellular mobile communication networks such public land mobile networks—normally require a subscriber identity module (SIM) or a universal subscriber identity module (USIM) in order to function normally.

The subscriber identity module or universal subscriber identity module may also be referred to as a universal integrated circuit card. A universal integrated circuit card (UICC) is a smart card inserted into the mobile terminal (or user equipment) and used as a user authentication module. The universal integrated circuit card may store personal information on a user and information on a mobile network operator (MNO) of a mobile service subscribed by the user. For example, the universal integrated circuit card may include an International Mobile Subscriber Identity (IMSI) to identify a user.

When the user installs the universal integrated circuit card in a user terminal or in a user equipment or also in a machine type communication device (MTC device), user authentication is automatically achieved using the information stored in the universal integrated circuit card, enabling the user to conveniently use the user equipment (or mobile device or machine type communication device). Further, when the user equipment (or mobile device or machine type communication device) is replaced, the user may install the universal integrated circuit card, detached from the user equipment, on a new user equipment, thereby conveniently changing the user equipment.

However, the requirement for the universal integrated circuit card to be replaceable has a number of drawbacks, especially related to the size of the user equipment, to the accessibility of the universal integrated circuit card within the user equipment, and the like. Therefore, embedded universal integrated circuit cards have been introduced. These embedded universal integrated circuit cards are not, or at least not easily, detachable from the hardware structure of the user equipment (or mobile terminal or machine type communication device). For example, the embedded universal integrated circuit cards are integrated or permanently connected (e.g. by soldering) to radio modules of the user equipments. Such radio modules typically provide the capabilities for physically enabling the establishment of a radio link between, on the one hand, the electronic device in question (such as the user equipment, the mobile device or the machine type communication device), and, on the other hand, a mobile communication network, typically according to one of the access technologies of mobile communication networks, such as GSM (Global System for Mobile Communication), UMTS (Universal Mobile Telecommunication System), LTE (Long term Evolution) and/or LTE advanced.

However, the use of embedded universal integrated circuit cards also have drawbacks such as problems associated with the initialization of the embedded universal integrated circuit card and/or with the provisioning of the embedded universal integrated circuit cards, especially in case that a mobile device needs to be used in a mobile communication network at the time of production of, e.g., a product into which the mobile device is integrated, and with the further requirement that the mobile device needs to be used later on in a different mobile communication network.

SUMMARY

In an exemplary embodiment, the invention provides a method for provisioning an embedded universal integrated circuit entity within an electronic device. The embedded universal integrated circuit entity is integrated in the electronic device. A memory area is assigned to the embedded universal integrated circuit entity. The electronic device comprises a microprocessor as well as a radio module, the radio module providing capabilities for physically enabling establishment of a radio link between the electronic device and a mobile communication network. The embedded universal integrated circuit entity is in data communication with the microprocessor. The method includes the following steps: in a first step, the embedded universal integrated circuit entity is initialized after being activated by the microprocessor; in a second step, subsequent to the first step, the embedded universal integrated circuit entity transmits a secret information to the microprocessor; in a third step, subsequent to the second step, the secret information is stored in the memory area; and in a fourth step, subsequent to the third step, an initial communication contact, using the radio link capabilities provided by the radio module, is established between, on the one hand, the electronic device and the embedded universal integrated circuit entity, and, on the other hand, the mobile communication network or a server device, wherein during the initial communication contact, an access number is transmitted, to the electronic device, by either the mobile communication network or the server device. The access number is assigned, by the mobile communication network, to the embedded universal integrated circuit entity such that the access number is able to be used by the embedded universal integrated circuit entity and the radio module for subsequent communication contacts with the mobile communication network after the initial communication contact.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
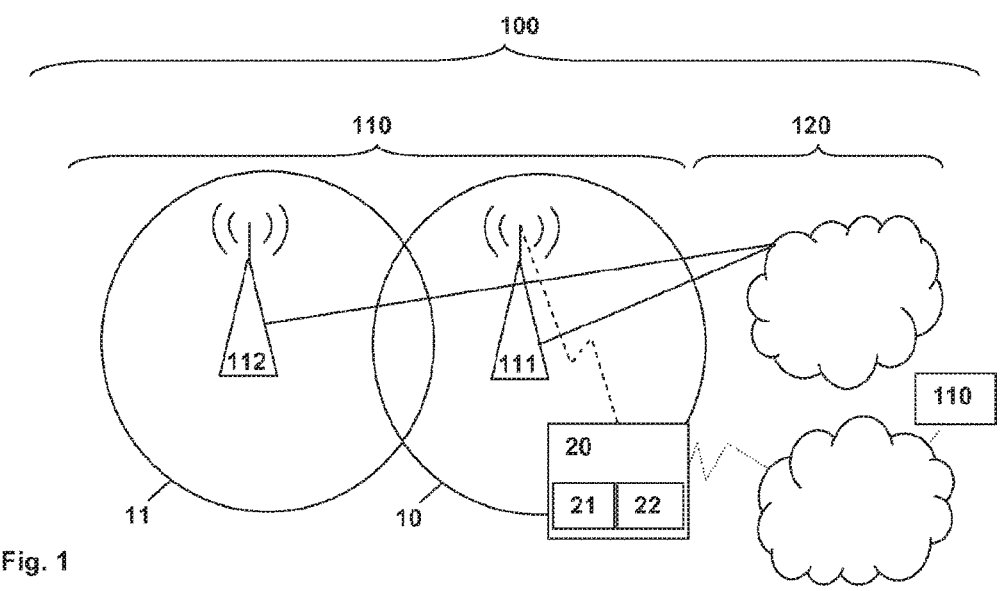
FIG. 1 schematically illustrates a mobile communication network and an electronic device that has access to the mobile communication network. Additionally, a server device is schematically shown, the electronic device having potentially also access to the server device via another telecommunications network.
Figure 2:
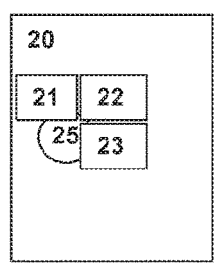
FIG. 2 schematically illustrates an example of an electronic device according to the present invention.

Exemplary embodiments of the present invention provide a technically simple, effective and especially cost effective solution for provisioning an embedded universal integrated circuit card or embedded universal integrated circuit entity within an electronic device such that it is possible to provide a maximum of flexibility and to reduce the requirements and hence the costs associated with the provisioning process of embedded universal integrated circuit cards or of embedded universal integrated circuit entities, while still providing a comparatively high level of security against fraud and misuse associated with provisioning process.

In an exemplary embodiment, the present invention provides a method for provisioning an embedded universal integrated circuit entity within an electronic device, wherein the embedded universal integrated circuit entity is integrated in the electronic device, wherein a memory area is assigned to the embedded universal integrated circuit entity, wherein the electronic device comprises a microprocessor as well as a radio module, the radio module providing the capabilities for physically enabling the establishment of a radio link between the electronic device on the one hand, and a mobile communication network on the other hand, wherein the embedded universal integrated circuit entity is in data communication with the microprocessor, wherein the method comprises the following steps:

in a first step, the embedded universal integrated circuit entity is initialized after being activated by the microprocessor, in a second step, subsequent to the first step, the embedded universal integrated circuit entity transmits a secret information to the microprocessor, in a third step, subsequent to the second step, the secret information is stored in the memory area, in a fourth step, subsequent to the third step, an initial communication contact, using the radio link capabilities provided by the radio module, is established between, on the one hand, the electronic device and the embedded universal integrated circuit entity, and, on the other hand, the mobile communication network or a server device, wherein during the initial communication contact, an access number is transmitted, to the electronic device, by either the mobile communication network or the server device, wherein the access number is assigned, by the mobile communication network, to the embedded universal integrated circuit entity such that the access number is able to be used by the embedded universal integrated circuit entity and the radio module for subsequent communication contacts with the mobile communication network, after the initial communication contact.

It is thereby advantageously possible according to the present invention that the provisioning of embedded universal integrated circuit entities can be realized more cost effectively, hence it is possible to realize that the access to the use of mobile communication networks is enhanced and applied to even more categories of products such as machines and consumer products.

According to the present invention, it is furthermore advantageously possible to integrate the provisioning of the embedded universal integrated circuit entities or embedded universal integrated circuit cards, especially with the radio module, in the process of quality management at the manufacturing level (i.e. at the site of manufacturing of the electronic devices or generally machines and consumer products, i.e. in the country of manufacture)—either with the manufacturing of the radio module or the manufacturing of the mobile communication network module.

Furthermore, it is advantageously possible to apply the method according to the present invention to machine type communication devices, i.e. user equipments that are or can be connected to mobile communication networks that are typically not operated by human beings but are connected to machines or to other devices that communicate with such machine type communication devices in order to automatically perform certain tasks such as transmitting meter readings or providing other kinds of sensor readings or the like.

One aspect of the present invention is to provide enhanced possibilities how communication is able to be automated between different machines, especially in the manner of machine type communication devices (also called "machine to machine communication" or "machine2machine communication" or "machine type communication").

According to the present invention, it is advantageously possible to equip machines and consumer products with radio modules and embedded universal integrated circuit entities or embedded universal integrated circuit cards already at the time of production of such machines and consumer products. The embedded universal integrated circuit entities or embedded universal integrated circuit cards are, e.g., realized as surface mounted devices attached to the printed circuit board of a radio module of the machines and consumer product such as electronic devices. Alternatively, the embedded universal integrated circuit entities or embedded universal integrated circuit cards are realized as part of the integrated circuits of the processor or another integrated circuit of the machines and consumer products, e.g. monolithically integrated into the main processor of such products.

According to the present invention, the embedded universal integrated circuit entity (or embedded universal integrated circuit card) is typically integrated in the electronic device, i.e. in the machine or consumer product. Furthermore, a memory area is assigned to the embedded universal integrated circuit entity or embedded universal integrated circuit card, wherein the memory area is normally part of the embedded universal integrated circuit entity or embedded universal integrated circuit card. Typically, the electronic device comprises a microprocessor as well as a radio module that provides the capabilities for physically enabling the establishment of a radio link between the electronic device and a mobile communication network.

The electronic device, i.e. the machine or the consumer product, is normally provided such that the embedded universal integrated circuit entity or embedded universal integrated circuit card is in data communication with the microprocessor such that, in a first step, the embedded universal integrated circuit entity can be initialized after being activated by the microprocessor.

In a second step, subsequent to the first step, the embedded universal integrated circuit entity (or embedded universal integrated circuit card) transmits a secret information to the microprocessor of the electronic device (i.e. the machine or consumer product).

Subsequently, in a third step, the secret information is stored in the memory area, typically a memory area of the embedded universal integrated circuit entity or embedded universal integrated circuit card.

According to the present invention, the secret information is typically kept secret, i.e. unknown to other devices or parties. Alternatively, it is also possible that the secret information is less secret and might be known either publicly or such that it can be retrieved in a manner comparatively easy, e.g. requiring a comparatively low number of calculations or calculating steps in view of the processing or calculation rate commercially available processors.

In a fourth step, subsequent to the third step, an initial communication contact is established between, on the one hand, the electronic device and the embedded universal integrated circuit entity, and, on the other hand, the mobile communication network or a server device. Thereby, the radio link capabilities provided by the radio module are used. In case that the electronic device and the embedded universal integrated circuit entity communicate with the mobile communication network, corresponding procedures are to be followed. In case that the electronic device and the embedded universal integrated circuit entity communicate with the server device (i.e. not using the mobile communication network), it is possible to simply rely on an IP connection (internet protocol connection) between the electronic device and the embedded universal integrated circuit entity and the server device.

According to the present invention and during the initial communication contact, data relating to the identity of the radio module and/or relating to the identity of the embedded universal integrated circuit entity (or embedded universal integrated circuit card) are used in order to generate an initial serial number for either the radio module or the embedded universal integrated circuit entity (or the embedded universal integrated circuit card) or both of the radio module and the embedded universal integrated circuit entity (embedded universal integrated circuit card). The initial serial number (or serial number) and the process to generate the identity has a fourfold benefit according to the present invention:

information relating to the quality with respect to the radio module and/or the embedded universal integrated circuit entity (embedded universal integrated circuit card) is available, e.g. in the form—for the radio module—of the model type together with the hardware version used and the software or firmware version used as well as the certification of the product and/or the approval of the type of the module by mobile network operators; or in the form—for the embedded universal integrated circuit entity (embedded universal integrated circuit card)—of the model type together with the hardware version used and the software or firmware version used as well as the certification of the product and/or the approval of the type of the module by mobile network operators;

it is possible to provide for the generation and/or transmission (to the mobile communication network and/or to the server device) of a unique code, that code being able to correspond, in certain cases (of e.g. product categories), to serial numbers, or that can be used, in other cases, as a credential for the coding of applications of the radio module;

according to the present invention, it is especially preferred that such initial data or initialization information is stored (e.g. as a database entry) in the home location register (HLR) of the mobile network operator at the production/manufacturing site of the electronic device (i.e. the machine or consumer product);

thereby, it is advantageously possible that information or data regarding the quality and the origin of the radio module and/or the corresponding embedded universal integrated circuit entity (or embedded universal integrated circuit card) can be retrieved globally (in case that access available to that data base).

According to the present invention, during the initial communication contact, an access number is transmitted, to the electronic device, by either the mobile communication network or the server device. The access number is typically assigned by the mobile communication network to the embedded universal integrated circuit entity (or embedded universal integrated circuit card) such that the access number is able to be used by the embedded universal integrated circuit entity (embedded universal integrated circuit card) and the radio module for subsequent communication contacts with the mobile communication network, after the initial communication contact. Thereby, the provisioning of the embedded universal integrated circuit entity (or embedded universal integrated circuit card) is conducted according to the present invention.

According to the present invention, it is advantageously possible that the radio module and the embedded universal integrated circuit entity (or the embedded universal integrated circuit card) are assigned an identity at the time of the initial communication contact, and the normal functionality of the radio module and of the embedded universal integrated circuit entity (or the embedded universal integrated circuit card) can be guaranteed or evidenced. Hence, it is advantageously possible that one step in the quality management process can be removed, e.g. at the time that the radio module is assembled with the electronic device or with another machine or consumer product. This is possible because quality related data and/or approval related data have already been determined (at the time of manufacturing and/or assembling the radio module and the embedded universal integrated circuit entity (embedded universal integrated circuit card) in the country of manufacture) by the mobile communication network and/or via conducting the initial communication contact and the associated storing of identity data in a data base of the mobile communication network (especially the home location register of the mobile communication network).

Furthermore advantageously, it is possible that the radio module comprises a unique and retrievable identity that might be linked later on with a subscriber contract. Additionally, it is advantageously possible to base encryption processes on relating the secret and unique identity of the radio module and of the embedded universal integrated circuit entity (or embedded universal integrated circuit card).

Additionally, it is advantageously possible that fraud and theft can be prevented, as a comparatively high level of security is possible to be provided via non-ambiguously assigning the radio module with the embedded universal integrated circuit entity (or embedded universal integrated circuit card) and via storing the access data and the secret data in the embedded universal integrated circuit entity (or embedded universal integrated circuit card) in an encrypted manner. Additionally, according to the present invention, it is provided for the possibility to identify the electronic device (e.g. a toy or a car or a machine tool or an automatic teller machine) by using the mobile communication network. By using, in such a manner, certified radio modules, it is advantageously possible according to the present invention to use two different layers of security, namely the identity that is stored in the securitized embedded universal integrated circuit entity (or embedded universal integrated circuit card) and the mirror identity of the embedded universal integrated circuit entity that exists in the home location register of the mobile network operator. Cases of fraud or misuse can be detected by comparing both identities with each other.

According to a preferred embodiment of the present invention, the initial communication contact, using the radio link capabilities provided by the radio module, is established using a cellular radio access technology, the cellular radio access technology especially using licensed radio spectrum.

Thereby, it is advantageously possible, according to the present invention, to easily initiate the provisioning process of the embedded universal integrated circuit entity (or the embedded universal integrated circuit card) and/or the radio module of the electronic device. It is especially advantageous to use cellular radio access technology, typically using licensed radio spectrum.

According to a preferred embodiment of the present invention, the initial communication contact, using the radio link capabilities provided by the radio module, is established using a non-cellular radio access technology, the non-cellular radio access technology especially using unlicensed radio spectrum, especially a wireless local area network (WLAN) connection and/or a WiFi connection and/or a Bluetooth connection and/or a Zigbee connection.

Thereby, it is advantageously possible, according to the present invention, to easily initiate the provisioning process of the embedded universal integrated circuit entity (or the embedded universal integrated circuit card) and/or the radio module of the electronic device using the server device, i.e. circumventing the use—during the initial communication contact—of the mobile communication network and hence cellular radio access technology. It is especially advantageous to use non-cellular radio access technology, especially a wireless local area network (WLAN) connection and/or a WiFi connection and/or a Bluetooth connection and/or a Zigbee connection, typically using unlicensed radio spectrum such as one of the ISM bands of radio frequencies (Industrial, Scientific and Medical Band) and/or of the SRD bands of radio frequencies (Short Range Devices), e.g. one of the following radio spectrum portions: from 6.765 MHz to 6.795 MHz and/or from 13.553 MHz to 13.567 MHz and/or from 26.957 MHz to 27.283 MHz and/or from 40.66 MHz to 40.70 MHz and/or from 149.025 MHz to 149.1125 MHz and/or from 433.05 MHz to 434.79 MHz and/or from 446.0 MHz to 446.2 MHz and/or from 863 MHz to 870 MHz and/or from 902 MHz to 928 MHz and/or from 2.400 GHz to 2.500 GHz and/or from 5.725 GHz to 5.875 GHz and/or from 24 GHz to 24.25 GHz and/or from 61 GHz to 61.5 GHz and/or from 122 GHz to 123 GHz and/or from 244 GHz to 246 GHz.

According to the present invention, it is furthermore preferred that a domain name and/or an internet protocol address is used to establish the initial communication contact between the embedded universal integrated circuit entity and the server device using an internet protocol connection, wherein especially a certification database, accessible via the server device, is queried for an entry associated with the embedded universal integrated circuit entity, especially for providing the access number to the embedded universal integrated circuit entity.

Thereby, it is advantageously possible, according to the present invention, to initiate the provisioning process of the embedded universal integrated circuit entity (or the embedded universal integrated circuit card) and/or the radio module of the electronic in a cost effective manner.

According to the present invention, it is furthermore preferred that the secret information is a secret information that is initially stored in the embedded universal integrated circuit entity.

Thereby, it is advantageously possible that the security level of the method is significantly enhanced.

According to a further preferred embodiment of the present invention, the secret information is a secret information that is generated by the embedded universal integrated circuit entity and/or by the microprocessor subsequent to the first step and prior to the second step.

Thereby, it is advantageously possible to maintain a relatively enhanced level of security while still being able to perform exemplary embodiments of the inventive method easily and cost effectively.

According to the present invention, it is furthermore preferred that subsequent to the fourth step, the embedded universal integrated circuit entity comprises an active profile, wherein the active profile corresponds to a mobile network operator subscription, and especially comprises an active profile international mobile subscriber identity (IMSI).

According to the present invention, it is thereby advantageously possible to easily and cost effectively provision the embedded universal integrated circuit entity (or embedded universal integrated circuit card) and the radio module of the electronic device.

According to a further preferred embodiment of the present invention, in a fifth step, subsequent to the fourth step, a status test is conducted by the embedded universal integrated circuit entity and/or the microprocessor, wherein by conducting the status test, status test result information is generated, wherein at least an information indicative of the status test result information is transmitted to the mobile communication network, especially to be stored in a repository assigned to a home location register and/or to a home subscriber server of the mobile communication network.

Thereby, it is advantageously possible to use the repository to contain at least an information indicative of the status test result information, or—according to an alternative embodiment of the present invention—also the status test result information (in case that the status test result information is transmitted to the mobile communication network, i.e. to the repository typically assigned to the home location register of the mobile communication network) for providing the possibility to later retrieve this information.

Furthermore, the present invention relates to a system for provisioning an embedded universal integrated circuit entity within an electronic device, the system comprising a mobile communication network and the electronic device, wherein the embedded universal integrated circuit entity is integrated in the electronic device, wherein a memory area is assigned to the embedded universal integrated circuit entity, wherein the electronic device comprises a microprocessor as well as a radio module, the radio module providing the capabilities for physically enabling the establishment of a radio link between the electronic device on the one hand, and the mobile communication network on the other hand, wherein the embedded universal integrated circuit entity is in data communication with the microprocessor, wherein the system is configured such that:

the embedded universal integrated circuit entity is initialized after being activated by the microprocessor, the embedded universal integrated circuit entity transmits a secret information to the microprocessor, the secret information is stored in the memory area, an initial communication contact, using the radio link capabilities provided by the radio module, is established between, on the one hand, the electronic device and the embedded universal integrated circuit entity, and, on the other hand, the mobile communication network, wherein during the initial communication contact, an access number is transmitted, to the electronic device, by either the mobile communication network, wherein the access number is assigned, by the mobile communication network, to the embedded universal integrated circuit entity such that the access number is able to be used by the embedded universal integrated circuit entity and the radio module for subsequent communication contacts with the mobile communication network, after the initial communication contact.

Thereby, it is advantageously possible to provide a system such that greater convenience is achieved in provisioning an embedded universal integrated circuit entity (or an embedded universal integrated circuit card) and/or a radio module of an electronic device.

Furthermore, it is preferred according to the present invention that the system furthermore comprises a server device, wherein the initial communication contact, using the radio link capabilities provided by the radio module, is established between, on the one hand, the electronic device and the embedded universal integrated circuit entity, and, on the other hand, the server device, wherein during the initial communication contact, an access number is transmitted, to the electronic device, by the server device.

Thereby, it is advantageously possible to easily and cost effectively provision the embedded universal integrated circuit entity (or embedded universal integrated circuit card) and/or the electronic device.

Furthermore, the present invention relates to an electronic device for provisioning an embedded universal integrated circuit entity within the electronic device, wherein the embedded universal integrated circuit entity is integrated in the electronic device, wherein a memory area is assigned to the embedded universal integrated circuit entity, wherein the electronic device comprises a microprocessor as well as a radio module, the radio module providing the capabilities for physically enabling the establishment of a radio link between the electronic device on the one hand, and a mobile communication network on the other hand, wherein the embedded universal integrated circuit entity is in data communication with the microprocessor, wherein the electronic device is configured such that:

the embedded universal integrated circuit entity is initialized after being activated by the microprocessor, the embedded universal integrated circuit entity transmits a secret information to the microprocessor, the secret information is stored in the memory area, an initial communication contact, using the radio link capabilities provided by the radio module, is established between, on the one hand, the electronic device and the embedded universal integrated circuit entity, and, on the other hand, the mobile communication network or a server device, wherein during the initial communication contact, an access number is transmitted, to the electronic device, by either the mobile communication network or the server device, wherein the access number is assigned, by the mobile communication network, to the embedded universal integrated circuit entity such that the access number is able to be used by the embedded universal integrated circuit entity and the radio module for subsequent communication contacts with the mobile communication network, after the initial communication contact.

Thereby, it is advantageously possible to provide an electronic device such that greater convenience is achieved in provisioning an embedded universal integrated circuit entity (or an embedded universal integrated circuit card) and/or a radio module of an electronic device.

Furthermore, it is preferred according to the present invention—especially with respect to the electronic device but also with respect to exemplary embodiments the inventive method, the inventive system and the inventive mobile communication network—that the embedded universal integrated circuit entity is an embedded universal integrated circuit card.

In the context of the present invention, the term "embedded universal integrated circuit entity" designates the provision of the functionality of an embedded universal integrated circuit card, regardless of whether this functionality is realized by physically integrating into the electronic device of a hardware module (either, e.g., soldered to a printed circuit board as an individual module, or otherwise integrated, such as, e.g., monolithically integrated with the processor on the (typically silicon) substrate of the (main) processor of the electronic device itself) or purely in software, such as, e.g., part of the operating system of the electronic device.

Furthermore, the present invention relates to a mobile communication network adapted for provisioning an embedded universal integrated circuit entity within an electronic device, wherein the embedded universal integrated circuit entity is integrated in the electronic device, wherein a memory area is assigned to the embedded universal integrated circuit entity, wherein the electronic device comprises a microprocessor as well as a radio module, the radio module providing the capabilities for physically enabling the establishment of a radio link between the electronic device on the one hand, and the mobile communication network on the other hand, wherein the embedded universal integrated circuit entity is in data communication with the microprocessor, wherein the mobile communication network is configured such that:

the embedded universal integrated circuit entity is initialized after being activated by the microprocessor, the embedded universal integrated circuit entity transmits a secret information to the microprocessor, the secret information is stored in the memory area, an initial communication contact, using the radio link capabilities provided by the radio module, is established between, on the one hand, the electronic device and the embedded universal integrated circuit entity, and, on the other hand, the mobile communication network or a server device, wherein during the initial communication contact, an access number is transmitted, to the electronic device, by either the mobile communication network or the server device, wherein the access number is assigned, by the mobile communication network, to the embedded universal integrated circuit entity such that the access number is able to be used by the embedded universal integrated circuit entity and the radio module for subsequent communication contacts with the mobile communication network, after the initial communication contact.

Thereby, it is advantageously possible to provide a mobile communication network such that greater convenience is achieved in provisioning an embedded universal integrated circuit entity (or an embedded universal integrated circuit card) and/or a radio module of an electronic device.

Additionally, the present invention relates to a program comprising a computer readable program code which, when executed on a computer and/or on a network node or on a plurality of network nodes of a mobile communication network and/or on an embedded universal integrated circuit entity and/or on a microprocessor of an electronic device, or in part on a network node or on a plurality of network nodes of a mobile communication network and in part on an embedded universal integrated circuit entity and in part on a microprocessor of an electronic device, causes the computer and/or network node or the plurality of network nodes and/or the embedded universal integrated circuit entity and/or the microprocessor of the electronic device to perform exemplary embodiments of the inventive method.

Still additionally, the present invention relates to a computer program product for provisioning an embedded universal integrated circuit entity within an electronic device, the computer program product comprising a computer program stored on a storage medium, the computer program comprising program code which, when executed on a computer and/or on a network node or on a plurality of network nodes of a mobile communication network and/or on an embedded universal integrated circuit entity and/or on a microprocessor of an electronic device, or in part on a network node or on a plurality of network nodes of a mobile communication network and in part on an embedded universal integrated circuit entity and in part on a microprocessor of an electronic device, causes the computer and/or network node or the plurality of network nodes and/or the embedded universal integrated circuit entity and/or the microprocessor of the electronic device to perform exemplary embodiments of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network 100, especially a public land mobile network, typically using cellular radio access technology, is schematically shown.

The mobile communication network 100 comprises an access network 110 and a core network 120. The mobile communication network 100 is preferably a cellular telecommunications network comprising typically a plurality of network cells (or radio cells), wherein two neighboring network cells (or radio cells) are represented in FIG. 1 by means of reference signs 10 and 11. The mobile communication network 100 typically comprises a plurality of user equipments 20 or telecommunication devices 20 or mobile terminals or electronic devices 20 (having a radio module 22 and an embedded universal integrated circuit entity 21, especially an embedded universal integrated circuit card. The access network 110 of the mobile communication network 100 comprises, in the exemplary representation of FIG. 1, a first base station entity 111, serving the (first) radio cell 10. Furthermore, a neighbor (second) base station entity 112, serving the neighbor (second) radio cell 11, is schematically shown. The base transceiver stations 111, 112 are typically base stations or base station entities, e.g. a NodeB or an eNodeB base transceiver station.

In order for the mobile communication network 100 to provide communication services to the user equipment or the electronic device 20, a connection is established between the mobile communication network 100 and the user equipment or electronic device 20. The establishment of such a communication necessitates the provisioning of access data, especially an access number, with respect to the user equipment or electronic device 20.

According to the present invention, such a provisioning of access data to the electronic device 20 (i.e. with respect to the embedded universal integrated circuit entity 21 (or embedded universal integrated circuit card)) is realized. The electronic device 20 comprises a memory area 21', wherein the memory area 21' is assigned to the embedded universal integrated circuit entity 21. Furthermore, the electronic device 20 comprises a microprocessor 23 as well as a radio module 22. The radio module 22 provides the capabilities for physically enabling the establishment of a radio link between the electronic device 20 on the one hand, and the mobile communication network 100 on the other hand.

The electronic device 20 is normally provided such that the embedded universal integrated circuit entity 21 or embedded universal integrated circuit card is in data communication with the microprocessor 23 such that, in a first step, the embedded universal integrated circuit entity 21 can be initialized after being activated by the microprocessor 23.

This is the starting point of an exemplary embodiment of the process in order to verify and check the functionality of the radio module 22 and/or the embedded universal integrated circuit entity 21, and potentially other parts or components of the electronic device 20, according to the present invention. Typically, the processor 23 of the electronic device 21 (and/or the processor of the radio module 22) routinely checks all registers and memory parts that are available. One of these registers and memory parts is the memory area 21' of the embedded universal integrated circuit entity 21 (or the memory area 21' assigned to the embedded universal integrated circuit entity 21). After this initial check, the embedded universal integrated circuit entity 21 (or embedded universal integrated circuit card) is initialized and the thus determined initial status stored in a fixed memory area or memory part of the embedded universal integrated circuit entity 21 (or embedded universal integrated circuit card). This initial status (or information related to the initial status) is then used to generate a serial number that comprises a secret information, that is available—from this generation time on—only to the processor 23 of the electronic device 20 (or the processor of the radio module 22) and/or to the embedded universal integrated circuit entity 21 (or embedded universal integrated circuit card). According to a preferred embodiment of the present invention, the initial data or initial status information (or information related to the initial status) is also stored in the radio module 22 such that—during the life time of the radio module 22 and/or of the embedded universal integrated circuit entity 21 or embedded universal integrated circuit card—a unique assignment exists between the radio module 22, on the one hand, and the embedded universal integrated circuit entity 21 (or embedded universal integrated circuit card), on the other hand.

In a subsequent step, a communication contact to a local mobile communication network 100 is tried to be established, and a first or initial communication contact to the mobile communication network 100 is established in order to transmit a secret information. Thereby, the radio link capabilities provided by the radio module 22 are used. In case that the electronic device 20 and the embedded universal integrated circuit entity 21 communicate with the mobile communication network 100, corresponding procedures are to be followed. The local mobile communication network 100 can be the mobile communication network 100 of a previously defined mobile network operator. During the initial communication contact, it is detected—based especially on the serial number—whether or not the request to provision a network access to the mobile communication network 100 has been transmitted by a certified and hence approved user equipment (or electronic device 20), especially in agreement with or being allowed to communicate with the mobile communication network 100. Alternatively, according to further preferred embodiments of the present invention, it might also be the case that data or information of the manufacturer of the electronic device 20 (or of the radio module 22 or of the embedded universal integrated circuit card) and/or initial data are transmitted to the mobile communication network 100. In case that the electronic device 20 and the embedded universal integrated circuit entity 21 communicate with the server device 110 (i.e. not using the mobile communication network 100), it is possible to simply rely on an IP connection (internet protocol connection) between the electronic device 20 and the embedded universal integrated circuit entity 21 and the server device 110. This is represented in FIG. 1 by means of a dotted line between the electronic device 20 and the server device 110 (passing through a cloud representation intended to represent a further telecommunications network assuring the transport of data of the IP connection (internet protocol connection).

After having successfully conducted the initial communication contact, an access number (especially a call number or a corresponding identification number (of the mobile communication network) is transmitted to the electronic device 20 (either using the mobile communication network 100 or using the server device 110). The access number is assigned, by the mobile communication network 100, to the embedded universal integrated circuit entity 21 such that the access number is able to be used by the embedded universal integrated circuit entity 21 and the radio module 22 for subsequent communication contacts with the mobile communication network 100, after the initial communication contact.

According to the present invention, it is preferred and advantageously possible that the initial data or initial information (especially status information of the embedded universal integrated circuit entity 21 (or embedded universal integrated circuit card) and/or of the radio module 22) are stored in a repository of the mobile communication network 100, and related to the access number. Thereby, it is advantageously possible—during, e.g., the subsequent manufacturing process of the electronic device 20 or of another machine or consumer product that comprises the electronic device 20—to determine whether the electronic device 20 and/or the embedded universal integrated circuit entity 21 (or embedded universal integrated circuit card) and/or the radio module 22 is a valid electronic device 20 and/or a valid embedded universal integrated circuit entity 21 (or embedded universal integrated circuit card) and/or a valid radio module 22, and whether it has been approved during the initial manufacturing process and whether a valid access number has been assigned.

According to the present invention, it is preferred and advantageously possible that after the registration process of the radio module 22 and/or of the embedded universal integrated circuit entity 21 (or of the embedded universal integrated circuit card) by the mobile communication network 100, a last status check of the embedded universal integrated circuit entity 21 (or embedded universal integrated circuit card) is performed and a verification program of the processor 23 of the electronic device 20 (or the processor of the radio module 22) conducted, and thereby the generation and verification of the entry of the access number in the corresponding repository of the mobile communication network 100, especially the home location register, finished.

Figure 3:
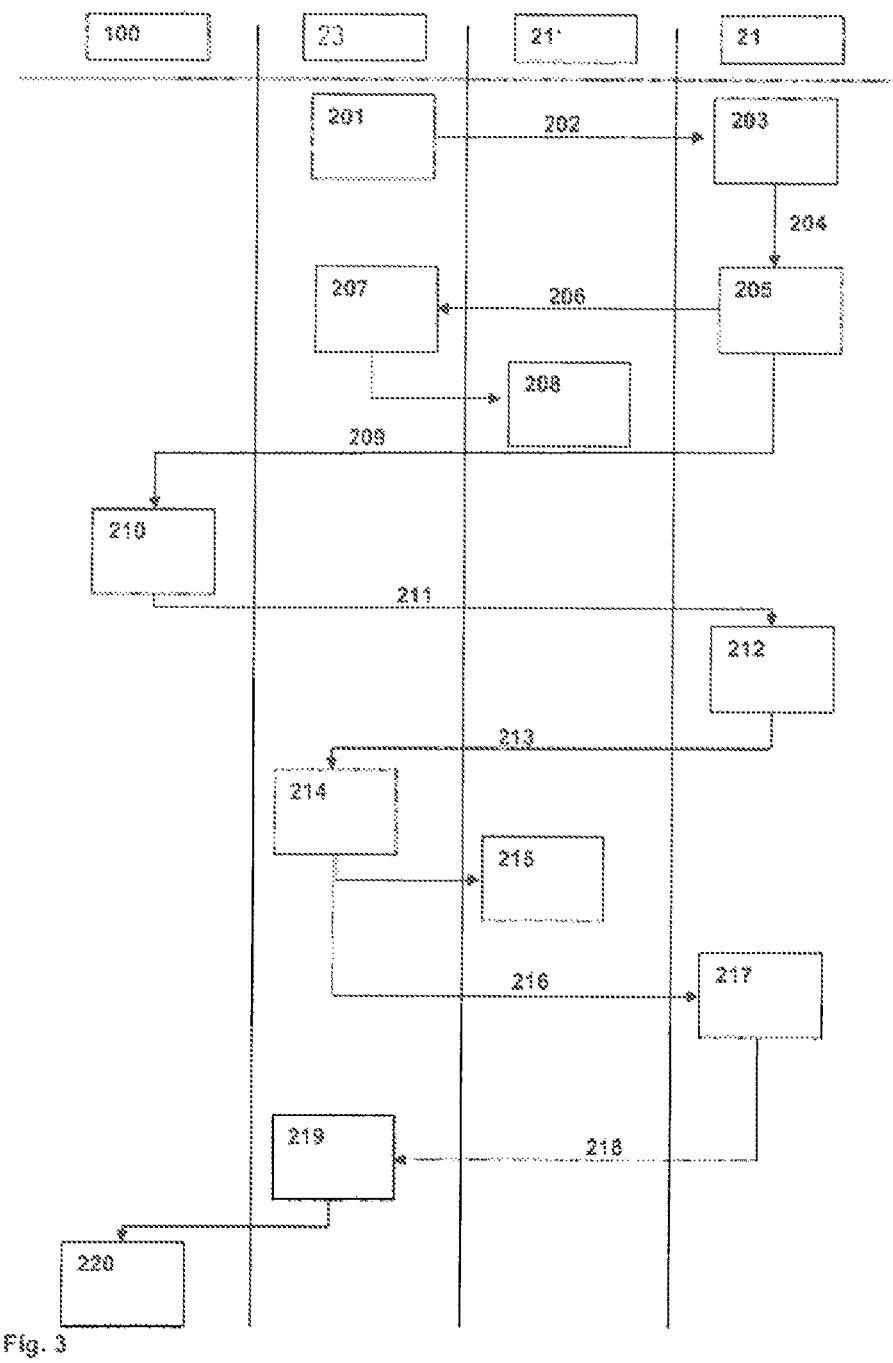
FIG. 3 schematically illustrates an example of a method for provisioning an embedded universal integrated circuit entity or card within an electronic device.

In FIG. 3, an exemplary embodiment of the inventive method for provisioning an embedded universal integrated circuit entity 21 or embedded universal integrated circuit card within an electronic device 20 is schematically represented. FIG. 3 represents the communication between the mobile communication network 100 (or the corresponding mobile network operator), the processor 23 of the electronic device 20 (or of the radio module 22 of the electronic device 20), the memory area 21' of the embedded universal integrated circuit entity 21 (or of the embedded universal integrated circuit card), and the embedded universal integrated circuit entity 21 (embedded universal integrated circuit card) itself Thereby, an exemplary embodiment of the inventive method is executed. This is, e.g., to be understood in the context of a manufacturing process of a machine or a consumer product, such as, for example, a toy product that is or comprises the electronic device 20 (and hence the radio module 22, the processor 23 and the embedded universal integrated circuit entity 21 (or the embedded universal integrated circuit card)) in order to provide, e.g., a localization functionality and/or a functionality to register and/or transmit operating parameters of the toy product (such as the temperature and/or accelerations or the like) in order to make such information—via the mobile communication network 100—available to a central repository.

An exemplary embodiment of the inventive process or method starts at a first processing step 201. During the first processing step 201, the status of the radio module 22 is checked. The process is continued in a second processing step 202. During the second processing step 202, the embedded universal integrated circuit entity 21 (or embedded universal integrated circuit card) is initialized. The process is continued in a third processing step 203. During the third processing step 203, the initial state or initial status (or information relating to the initial state) of the radio module 22 and/or of the embedded universal integrated circuit entity 21 (or of the embedded universal integrated circuit card) are stored. The process is continued in a fourth processing step 204. During the fourth processing step 204, a secret identity is generated—in the embedded universal integrated circuit entity 21 (or embedded universal integrated circuit card)—based on the data related to the initial state. The process is continued in a fifth processing step 205. During the fifth processing step 205, the secret identity or secret information are stored in the embedded universal integrated circuit entity 21 (or embedded universal integrated circuit card).

The process is continued in a sixth processing step 206 and in a ninth processing step 209. During the sixth processing step 206, the secret identity or secret information is transmitted to the processor 23. The process is continued in a seventh processing step 207. During the seventh processing step 207, the secret identity or secret information is processed with initial data. The process is continued in an eighth processing step 208. During the eighth processing step 208, the secret identity or secret information is permanently stored in the memory area 21' of the embedded universal integrated circuit entity 21 (or embedded universal integrated circuit card).

During the ninth processing step 209, the transmission of the secret identity or secret information (or parts thereof) is requested by mobile communication network 100, or— according to an alternative embodiment of the invention— the secret identity or secret information (or a part thereof) is transmitted to the mobile communication network 100 together with a request to provide an access number. The process is continued in a tenth processing step 210. During the tenth processing step 210, the mobile communication network 100 (or the mobile network operator) receives the status data or status information or the identity data or identity information and allocates an access number (such as, e.g., an IMSI (international mobile subscriber identity) or MSISDN (Mobile Subscriber Integrated Services Digital Network Number) number).

The process is continued in an eleventh processing step 211. During the eleventh processing step 211, the allocated access number is transmitted to the embedded universal integrated circuit entity 21 (or embedded universal integrated circuit card). The process is continued in a twelfth processing step 212. During the twelfth processing step 212, access number—received from the mobile communication network 100—is stored in the embedded universal integrated circuit entity 21 (or embedded universal integrated circuit card). The process is continued in a thirteenth processing step 213. During the thirteenth processing step 213, the access number is transmitted to the processor 23. The process is continued in a fourteenth processing step 214. During the fourteenth processing step 214, the access number is processed. The process is continued in a fifteenth processing step 215 and a sixteenth processing step 216. During the fifteenth processing step 215, the access number is stored in the memory area 21' of the embedded universal integrated circuit entity 21 (or embedded universal integrated circuit card) and/or in the radio module 23.

During the sixteenth processing step 216, a request to perform a status test is transmitted from the processor 23 to the embedded universal integrated circuit entity 21 (or embedded universal integrated circuit card). The process is continued in a seventeenth processing step 217. During the seventeenth processing step 217, the status test is performed at the embedded universal integrated circuit entity 21 (or embedded universal integrated circuit card). The process is continued in an eighteenth processing step 218. During the eighteenth processing step 218, the status is confirmed. The process is continued in a nineteenth processing step 219. During the nineteenth processing step 219, the status test or the verification program, and hence the initialization process is terminated. The process is continued in a twentieth processing step 220. During the twentieth processing step 220, the initialization data are transmitted to the home location register of the mobile communication network 100 with the indication to relate these with the allocated access number.

After having performed the twentieth processing step 220, the home location register of the mobile communication network 100 comprises information regarding the initialization status or state of the radio module 22 and/or of the embedded universal integrated circuit entity 21 (or the embedded universal integrated circuit card), as well as at least a part of the secret identity information (secret information) of the embedded universal integrated circuit entity 21 (or the embedded universal integrated circuit card). Upon arrival of the manufactured product (i.e. the electronic device 20 or a machine or a toy or the like) in the destination country, it is advantageously possible, according to the present invention, to retrieve information or data related to the quality (or approval checks) of the embedded universal integrated circuit entity 21 (or the embedded universal integrated circuit card) and regarding its functionality. Additionally, information or data related to the quality (or approval checks) of the radio module 22 associated with the embedded universal integrated circuit entity 21 (or embedded universal integrated circuit card) and/or of sensors or of other components of the electronic device 20 are able to be retrieved. Thereby, it is advantageously possible to avoid at least one step in the quality management program related to the electronic device (i.e. the machine or consumer product).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for provisioning an embedded universal integrated circuit entity within an electronic device, wherein the embedded universal integrated circuit entity is integrated in the electronic device, wherein a memory area is assigned to the embedded universal integrated circuit entity, wherein the electronic device comprises a microprocessor as well as a radio module, the radio module providing capabilities for physically enabling establishment of a radio link between the electronic device and a mobile communication network, wherein the embedded universal integrated circuit entity is in data communication with the microprocessor, wherein the method comprises the following steps:

in a first step, the embedded universal integrated circuit entity is initialized after being activated by the microprocessor;

in a second step, subsequent to the first step, the embedded universal integrated circuit entity transmits secret information to the microprocessor;

in a third step, subsequent to the second step, the secret information is stored in the memory area; and in a fourth step, subsequent to the third step, an initial communication contact, using the radio link capabilities provided by the radio module, is established between, on the one hand, the electronic device and the embedded universal integrated circuit entity, and, on the other hand, the mobile communication network or a server device, wherein during the initial communication contact, an access number is transmitted, to the electronic device, by either the mobile communication network or the server device;

wherein the access number is assigned, by the mobile communication network, to the embedded universal integrated circuit entity such that the access number is able to be used by the embedded universal integrated circuit entity and the radio module for subsequent communication contacts with the mobile communication network after the initial communication contact;

wherein the secret information is generated by the embedded universal integrated circuit entity subsequent to the first step and prior to the second step.

2. The method according to claim 1, wherein the initial communication contact, using the radio link capabilities provided by the radio module, is established using a cellular radio access technology.

3. The method according to claim 2, wherein the cellular radio access technology uses a licensed radio spectrum.

4. The method according to claim 1, wherein the initial communication contact, using the radio link capabilities provided by the radio module, is established using a non-cellular radio access technology.

5. The method according to claim 4, wherein the non-cellular radio access technology uses an unlicensed radio spectrum.

6. The method according to claim 1, wherein a domain name and/or an internet protocol address is used to establish the initial communication contact between the embedded universal integrated circuit entity and the server device using an internet protocol connection, wherein a certification database, accessible via the server device, is queried for an entry associated with the embedded universal integrated circuit entity.

7. The method according to claim 1, wherein the secret information is initially stored in the embedded universal integrated circuit entity.

8. The method according to claim 1, wherein subsequent to the fourth step, the embedded universal integrated circuit entity comprises an active profile, wherein the active profile corresponds to a mobile network operator subscription.

9. The method according to claim 1, further comprising:

in a fifth step, subsequent to the fourth step, a status test is conducted by the embedded universal integrated circuit entity and/or the microprocessor, wherein by conducting the status test, status test result information is generated, wherein at least an information indicative of the status test result information is transmitted to the mobile communication network and to be stored in a repository assigned to a home location register and/or to a home subscriber server of the mobile communication network.

10. The method according to claim 1, wherein during the initial communication contact, data relating to the identity of the radio module and relating to the identity of the embedded universal integrated circuit entity is used in order to generate an initial serial number for both of the radio module and the embedded universal integrated circuit entity, wherein the initial serial number is stored in a home location register of a mobile network operator at a production or manufacturing site of the electronic device.

11. A system for provisioning an embedded universal integrated circuit entity within an electronic device, the system comprising:

a mobile communication network; and the electronic device;

wherein the embedded universal integrated circuit entity is integrated in the electronic device, wherein a memory area is assigned to the embedded universal integrated circuit entity, wherein the electronic device comprises a microprocessor as well as a radio module, the radio module providing the capabilities for physically enabling the establishment of a radio link between the electronic device and the mobile communication network, wherein the embedded universal integrated circuit entity is in data communication with the microprocessor;

wherein the system is configured to facilitate the following:

the embedded universal integrated circuit entity is initialized after being activated by the microprocessor;

secret information is generated by the embedded universal integrated circuit entity;

the embedded universal integrated circuit entity transmits the secret information to the microprocessor;

the secret information is stored in the memory area;

an initial communication contact, using the radio link capabilities provided by the radio module, is established between, on the one hand, the electronic device and the embedded universal integrated circuit entity, and, on the other hand, the mobile communication network, wherein during the initial communication contact, an access number is transmitted, to the electronic device, by the mobile communication network; and the access number is assigned, by the mobile communication network, to the embedded universal integrated circuit entity such that the access number is able to be used by the embedded universal integrated circuit entity and the radio module for subsequent communication contacts with the mobile communication network after the initial communication contact.

12. The system according to claim 11, wherein the system further comprises a server device, and wherein the system is further configured such that:

another initial communication contact, using the radio link capabilities provided by the radio module, is established between, on the one hand, the electronic device and the embedded universal integrated circuit entity, and, on the other hand, the server device, wherein during the another initial communication contact, an access number is transmitted, to the electronic device, by the server device.

13. The system according to claim 11, wherein during the initial communication contact, data relating to the identity of the radio module and relating to the identity of the embedded universal integrated circuit entity is used in order to generate an initial serial number for both of the radio module and the embedded universal integrated circuit entity, wherein the initial serial number is stored in a home location register of a mobile network operator at a production or manufacturing site of the electronic device.

14. A non-transitory computer-readable medium having processor-executable instructions stored thereon for provisioning an embedded universal integrated circuit entity within an electronic device, wherein the embedded universal integrated circuit entity is integrated in the electronic device, wherein a memory area is assigned to the embedded universal integrated circuit entity, wherein the electronic device comprises a microprocessor as well as a radio module, the radio module providing capabilities for physically enabling establishment of a radio link between the electronic device and a mobile communication network, wherein the embedded universal integrated circuit entity is in data communication with the microprocessor, wherein the processor-executable instructions, when executed, facilitate performance of the following steps:

in a first step, the embedded universal integrated circuit entity is initialized after being activated by the microprocessor;

in a second step, subsequent to the first step, the embedded universal integrated circuit entity transmits secret information to the microprocessor;

in a third step, subsequent to the second step, the secret information is stored in the memory area; and in a fourth step, subsequent to the third step, an initial communication contact, using the radio link capabilities provided by the radio module, is established between, on the one hand, the electronic device and the embedded universal integrated circuit entity, and, on the other hand, the mobile communication network or a server device, wherein during the initial communication contact, an access number is transmitted, to the electronic device, by either the mobile communication network or the server device;

wherein the access number is assigned, by the mobile communication network, to the embedded universal integrated circuit entity such that the access number is able to be used by the embedded universal integrated circuit entity and the radio module for subsequent communication contacts with the mobile communication network after the initial communication contact;

wherein the secret information is generated by the embedded universal integrated circuit entity subsequent to the first step and prior to the second step.

15. The non-transitory computer-readable medium according to claim 14, wherein during the initial communication contact, data relating to the identity of the radio module and relating to the identity of the embedded universal integrated circuit entity is used in order to generate an initial serial number for both of the radio module and the embedded universal integrated circuit entity, wherein the initial serial number is stored in a home location register of a mobile network operator at a production or manufacturing site of the electronic device.

* * * * *